US012005986B2

(12) United States Patent
Burnell (10) Patent No.: US 12,005,986 B2
(45) Date of Patent: Jun. 11, 2024

(54) MOTORCYCLE HEADLIGHT

(71) Applicant: Nathan Burnell, Sun City, AZ (US)

(72) Inventor: Nathan Burnell, Sun City, AZ (US)

( * ) Notice: Subject to any disclaimer, the term of this patent is extended or adjusted under 35 U.S.C. 154(b) by 0 days.

(21) Appl. No.: 18/139,980

(22) Filed: Apr. 27, 2023

(65) Prior Publication Data

US 2024/0083536 A1   Mar. 14, 2024

Related U.S. Application Data

(60) Provisional application No. 63/335,245, filed on Apr. 27, 2022.

(51) Int. Cl.
*B62J 6/027* (2020.01)

(52) U.S. Cl.
CPC ..................... *B62J 6/027* (2020.02)

(58) Field of Classification Search
CPC ..... B62J 6/02; B62J 6/026; B62J 6/027; B62J 6/025; B60Q 1/0683
See application file for complete search history.

(56) References Cited

U.S. PATENT DOCUMENTS

| | | | | |
|---|---|---|---|---|
| 3,735,121 A | * | 5/1973 | Jaeger | B60Q 1/0683 403/81 |
| 6,158,279 A | * | 12/2000 | Saiki | G01P 1/026 324/166 |
| 9,056,579 B2 | * | 6/2015 | Yun | B62J 6/026 |
| 9,772,088 B1 | * | 9/2017 | LoPresti | F21V 7/05 |
| 2009/0231869 A1 | * | 9/2009 | Osugi | B60Q 1/0683 362/475 |
| 2009/0237948 A1 | * | 9/2009 | Oshima | B62J 6/027 362/474 |
| 2011/0141742 A1 | * | 6/2011 | Tanaka | F21S 41/155 362/294 |
| 2011/0273896 A1 | * | 11/2011 | Yun | B60Q 1/0047 362/476 |
| 2017/0327027 A1 | * | 11/2017 | Takaya | F21S 41/663 |
| 2019/0017676 A1 | * | 1/2019 | Van Straten | F21S 45/33 |
| 2019/0092218 A1 | * | 3/2019 | Kouchi | F21S 41/635 |
| 2020/0290695 A1 | * | 9/2020 | Yamasaki | B62J 6/027 |
| 2022/0153375 A1 | * | 5/2022 | Schartz | B62J 6/026 |

FOREIGN PATENT DOCUMENTS

WO   WO 2018/159014   *   9/2018   ............. B62J 50/21

\* cited by examiner

*Primary Examiner* — Zheng Song
(74) *Attorney, Agent, or Firm* — Bruce A. Lev (57) ABSTRACT

An improved motorcycle headlight that provides sufficient lighting in conditions and circumstances that standard OEM headlights do not and that will align properly and more easily with the mounting points of existing OEM motorcycle headlight housing mounting brackets.

6 Claims, 7 Drawing Sheets

MOTORCYCLE HEADLIGHT

CROSS-REFERENCE TO RELATED APPLICATION

The present application is related to and claims priority from prior provisional application Ser. No. 63/335,245, filed Apr. 27, 2022 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to motorcycle headlights and more particularly to the attachment of LED motorcycle headlights to standard OEM (Original Equipment Manufacturer) headlight housing mounting brackets.

2. Description of the Related Art

Prior art motorcycles are manufactured with standard OEM (Original Equipment Manufacturer) headlights that are attachable to OEM headlight housing mounting brackets. The OEM housing mounting brackets have specific mounting points for attachment of the standard OEM headlights. It has been found that in many instances standard OEM headlights do not provide sufficient lighting in all conditions and circumstances. As such, improved motorcycle headlights are needed. This is accomplished by forming the headlight bulbs as LED bulbs. However, LED motorcycle headlights do not have mounting connectors on the back portions thereof to connect with OEM housing mounting brackets. Some have tried to use mounting tape or weather stripping to make the connection, however these methods are not secure, become loose easily, and disconnect quickly and often. Thus, a need exists for an improved LED motorcycle headlight that provides sufficient lighting in conditions and circumstances that the standard OEM headlights do not and that will securely connect with the mounting points of existing OEM motorcycle mounting brackets to avoid the above-mentioned problems.

BRIEF SUMMARY OF THE INVENTION

In view of the foregoing disadvantages inherent in the known types of standard OEM motorcycle headlights or the like in the prior art, the present invention provides an improved motorcycle headlight. As such, the general purpose of the present invention, which will be described subsequently in greater detail, is to provide an improved motorcycle headlight that provides sufficient lighting in conditions and circumstances that the standard OEM headlights do not and that will securely connect with the mounting points of existing OEM motorcycle housing mounting brackets with all the advantages of the prior art and none of the disadvantages.

There has thus been outlined, rather broadly, the more important features of the invention in order that the detailed description thereof that follows may be better understood and in order that the present contribution to the art may be better appreciated. The features of the invention which are believed to be novel are particularly pointed out and distinctly claimed in the concluding portion of the specification. These and other features, aspects, and advantages of the present invention will become better understood with reference to the following drawings and detailed description.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments and method(s) of use for the present invention, An Improved Motorcycle Headlight, constructed and operative according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

As discussed above, embodiments of the present invention relate to an improved motorcycle headlight that provides sufficient lighting in conditions and circumstances that the standard OEM headlights do not and that will securely connect with the mounting points of existing OEM motorcycle headlight housing mounting brackets The preferred embodiment of the instant headlight is formed as a 5.75" LED Projector Headlight 100. The back 110 of the headlight 100 is custom made to fit the stock OEM headlight housing mounting bracket 215 for the following Motorcycles:, a 2002-2009 Honda VTX 1300, and VTX 1800 (model include R, T, S, C, N, & F); and 2010-2023 Honda VT 1300 (models include Honda Fury, Honda Sabre, Honda Interstate, Honda Stateline). It is formed as a direct bolt-on plug-and-play set up. Furthermore, the improved motorcycle headlight can fit current motorcycles, including the 2017-2023 Honda Rebel 250 and the 2017-2023 Honda Rebel 500.

Referring now to the drawings FIGS. 1-7, the improved motorcycle headlight 100 comprises a back 110 having a first connector 120 and a second connector 130 positioned and spaced from one another in order to securely connect with the mounting clips 212 and 214 of existing OEM motorcycle headlight housing mounting brackets 215, which connects to the OEM headlight housing 210 of the standard (prior art) OED headlight 200; an electric cord aperture 140; an electrical cord 150; and a LED bulb 160 including LED lights 170.

Figure 1:
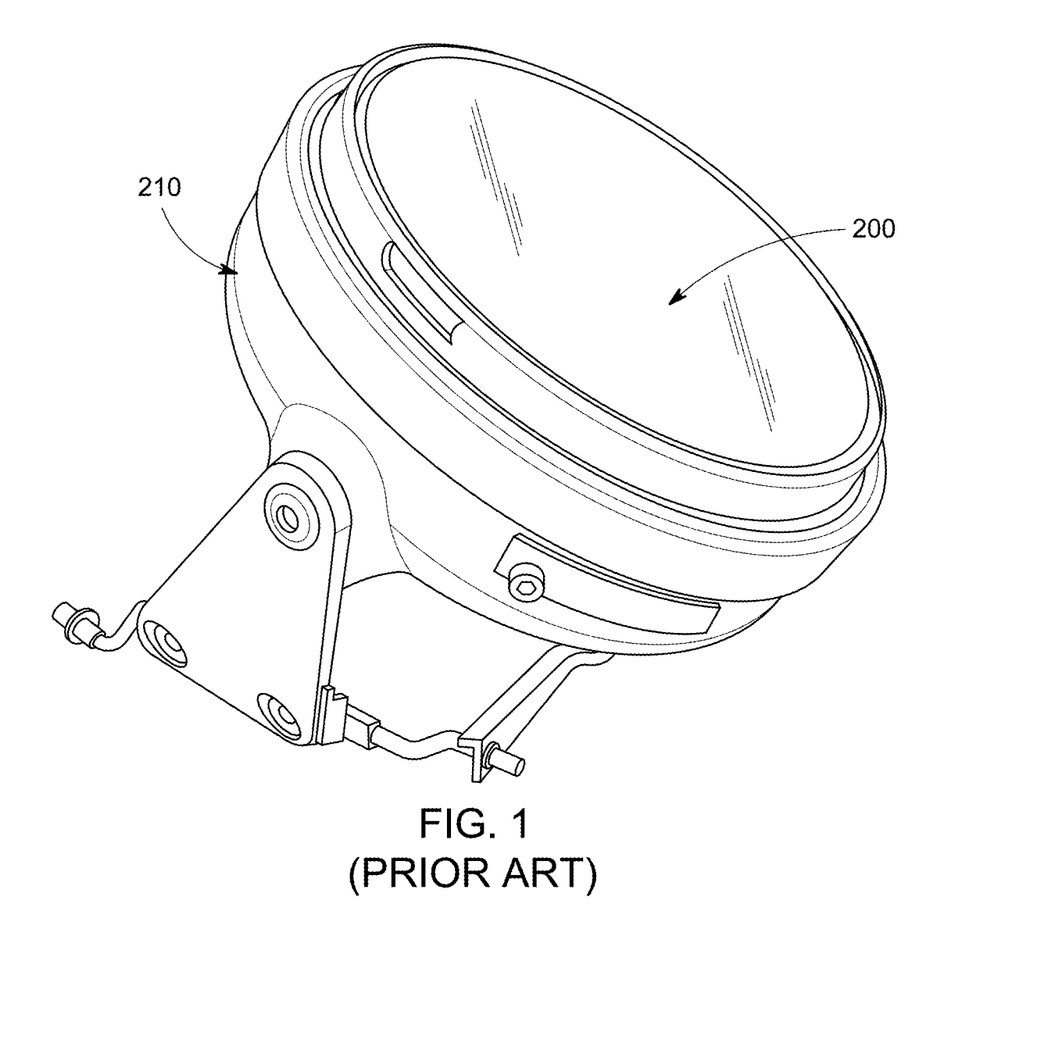
FIG. 1 shows a perspective view illustrating a prior art OED headlight installed within a prior art OEM headlight housing.
Figure 2:
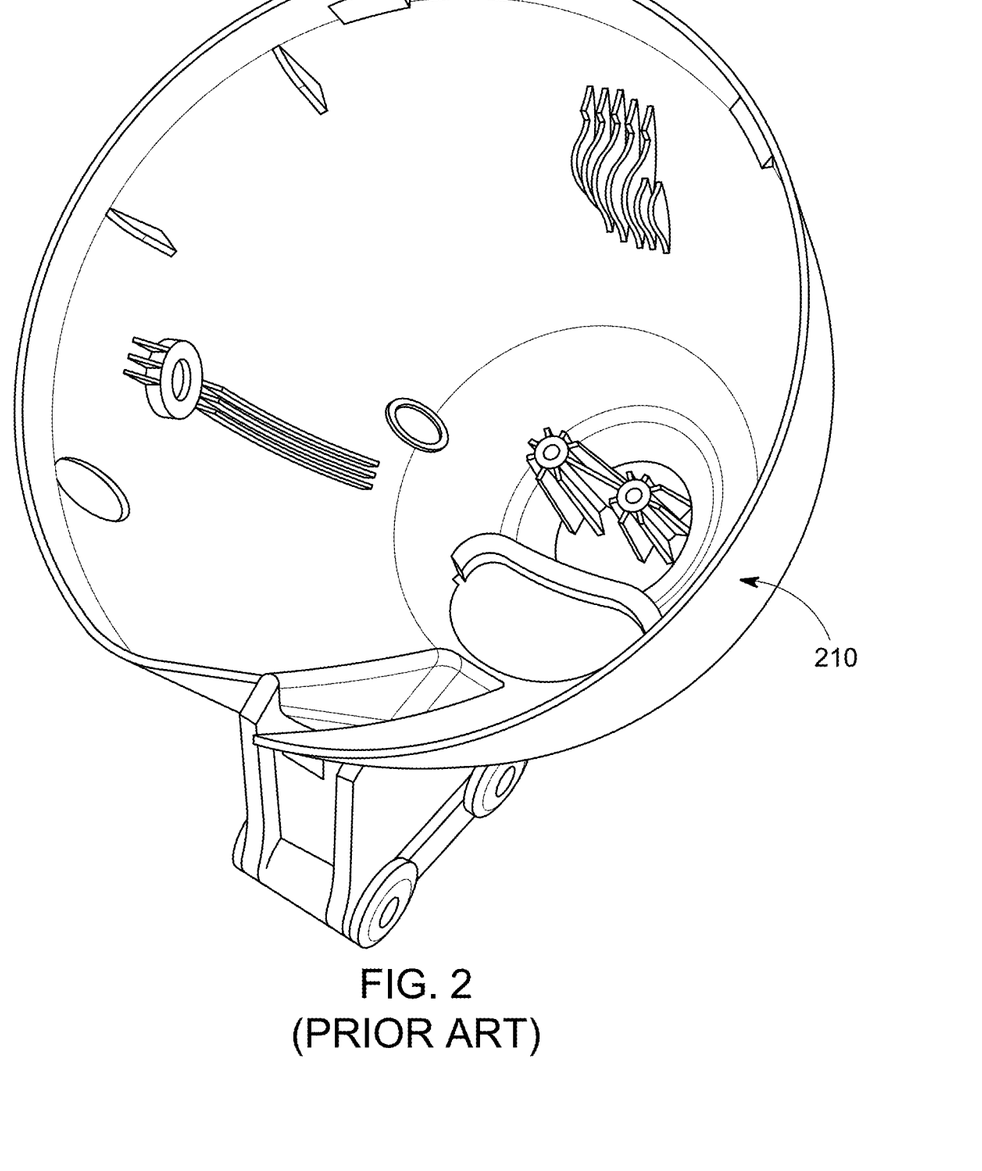
FIG. 2 shows a perspective view illustrating the inside of an OEM headlight housing.
Figure 3:
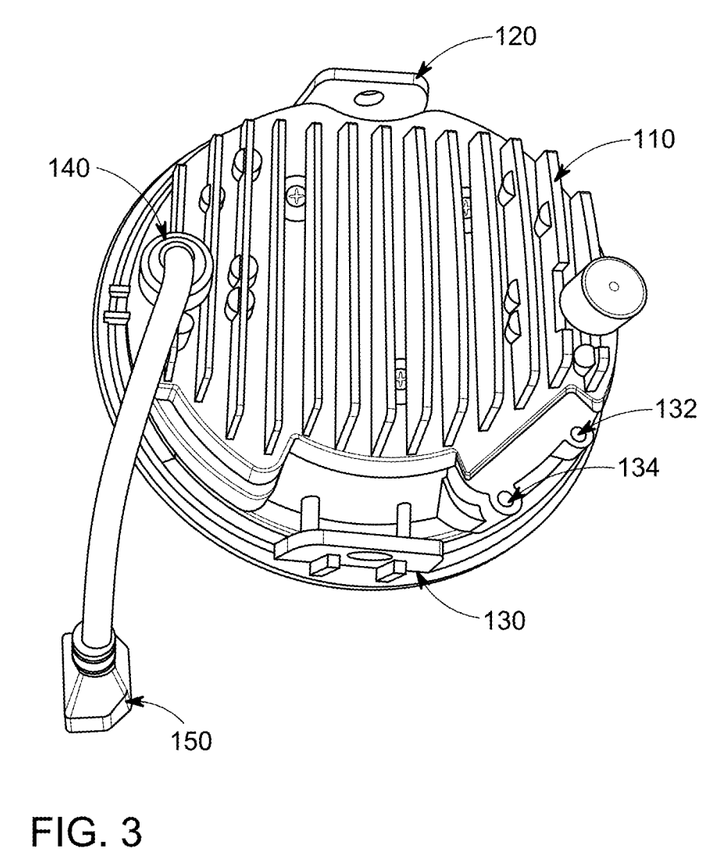
FIG. 3 shows a perspective view illustrating the back of a prior art OED headlight as compared to back of the improved motorcycle headlight.

As shown in FIG. 3, the back 110 of the improved motorcycle headlight 100 is compared to the back 300 of a standard (prior art) OED headlight 200. The first connector 120 and a second connector 130 of the improved motorcycle headlight 100 are positioned and spaced from one another in order to securely connect with the mounting clips 212 and 214 of the existing OEM motorcycle headlight housing mounting brackets 215 to more securely attach to existing OEM motorcycle mounting brackets 215 than the standard (prior art) OED headlight 200.

Figure 4:
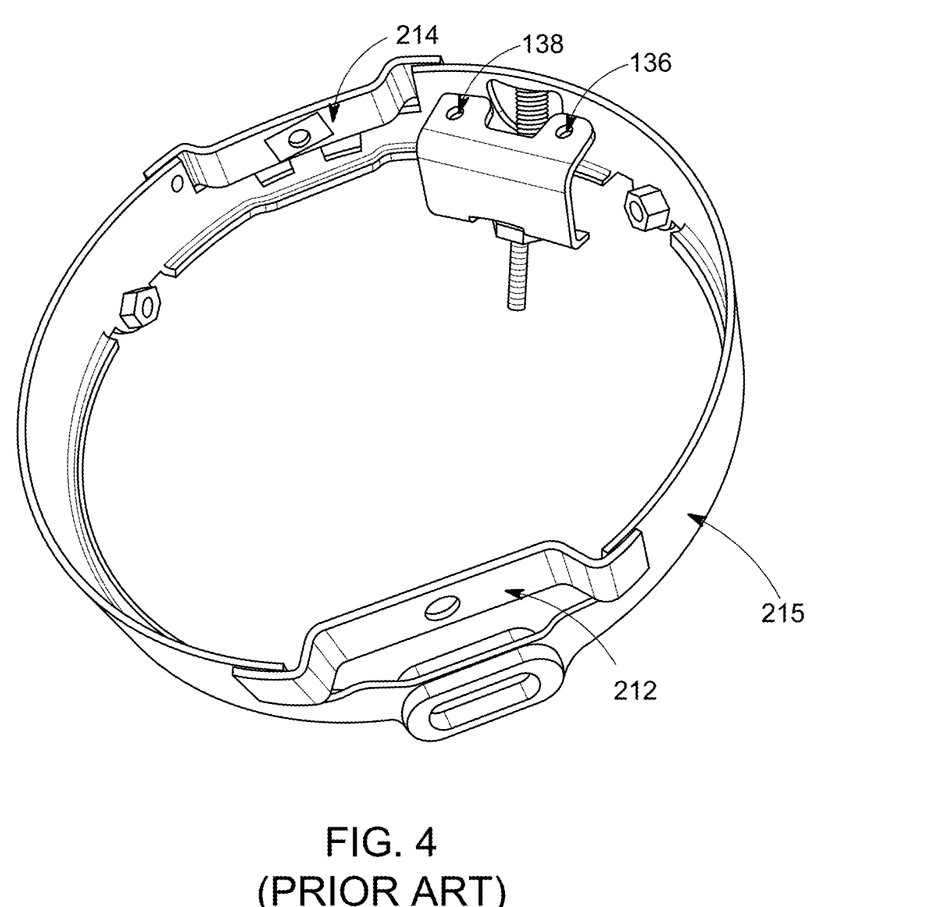
FIG. 4 shows a perspective view illustrating an OEM headlight housing mounting bracket.
Figure 5:
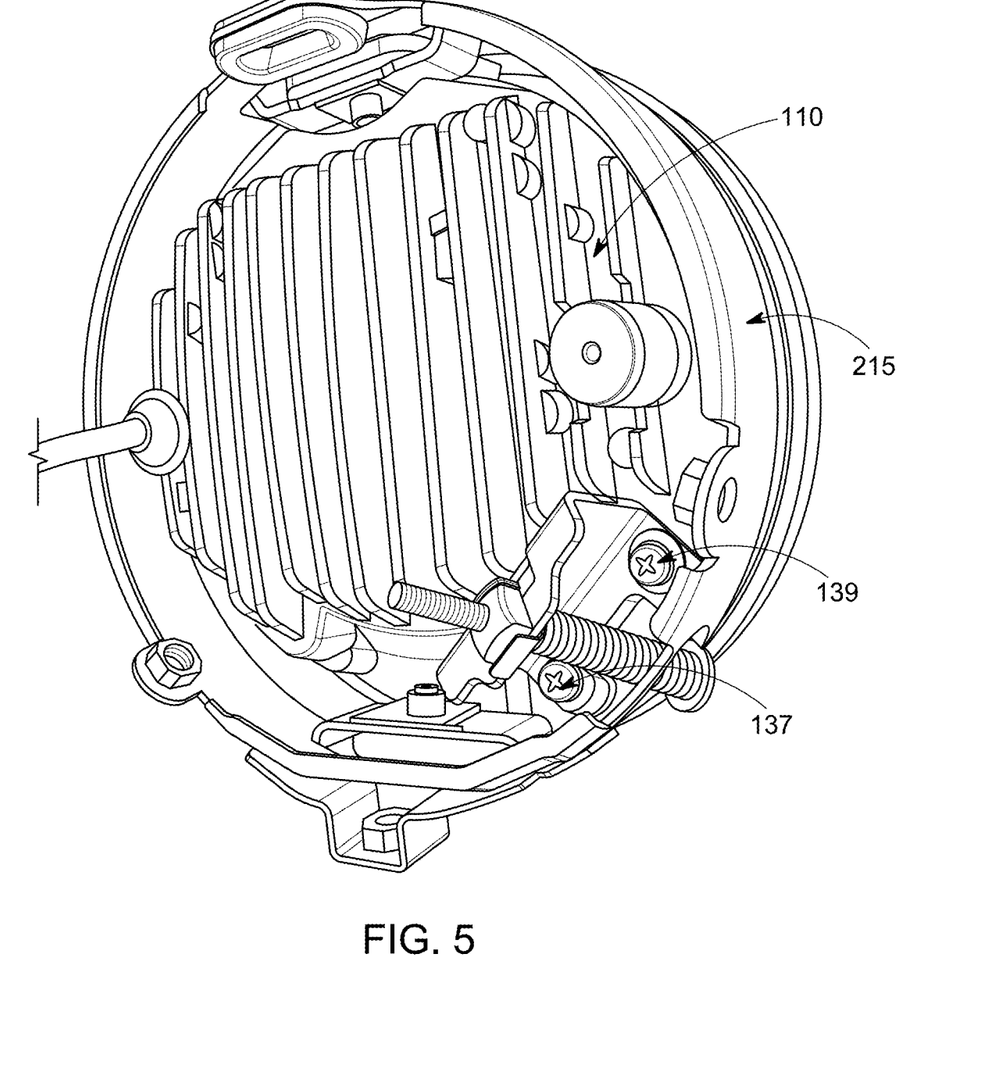
FIG. 5 shows a back perspective view illustrating the improved motorcycle headlight attached to an OEM headlight housing mounting bracket.
Figure 6:
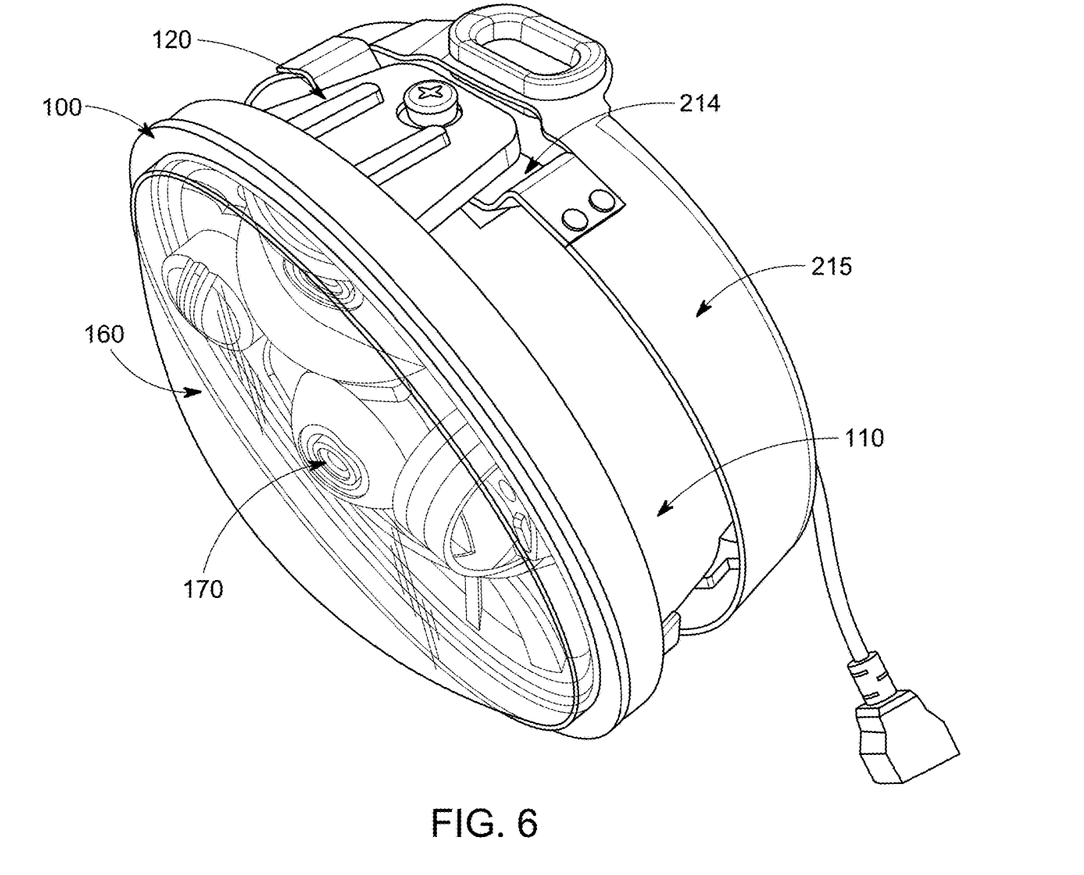
FIG. 6 shows a front perspective view illustrating the improved motorcycle headlight attached to an OEM headlight housing mounting bracket.
Figure 7:
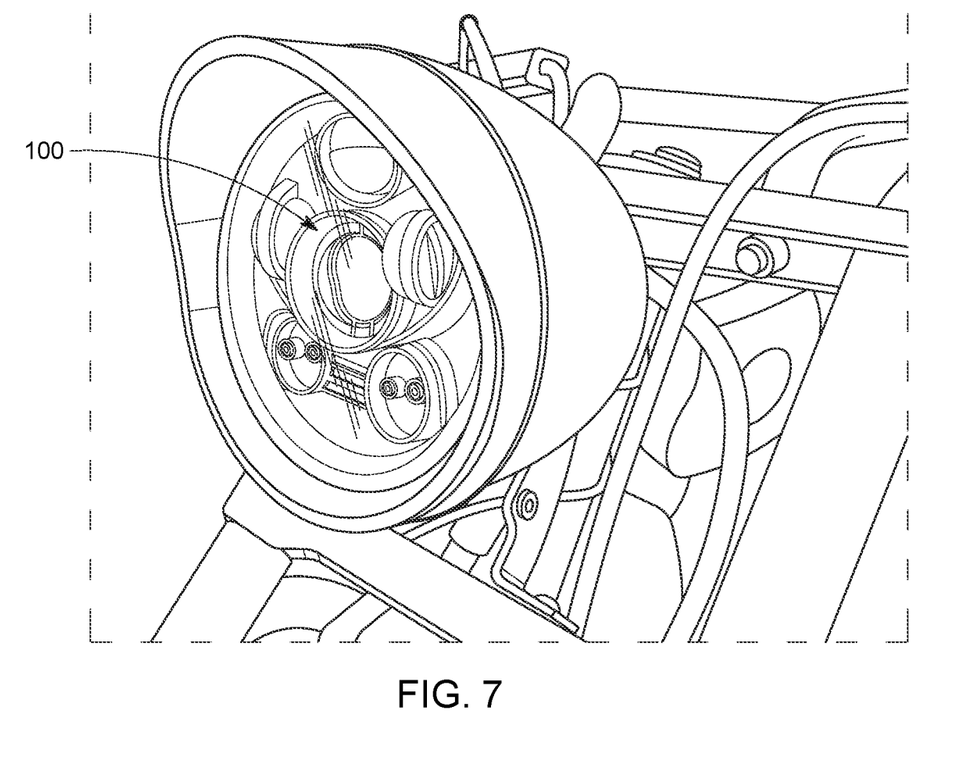
FIG. 7 shows a perspective view illustrating the improved motorcycle headlight attached to a motorcycle.

As shown in FIGS. 3-5, the existing OEM motorcycle headlight housing mounting brackets 215 includes adjustment screw holes 136 and 138 for adjustment screws 137 and 139, and the back 110 of the improved motorcycle headlight 100 includes adjustment screw holes 132 and 134. As such, the angle of the improved motorcycle headlight 100 can be adjusted with respect to the OEM headlight housing 210 of the standard (prior art) OED headlight 200 when in use.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. An improved motorcycle headlight comprising:
   a back including:
     a first connector; and
     a second connector;
     wherein said first connector and said second connector are positioned and spaced from one another such that said improved motorcycle headlight is adapted to connect with mounting clips of existing motorcycle headlight housing mounting brackets that are adapted to connect with headlight housings of existing motorcycle headlights; and
   an LED bulb including:
     at least one LED light;
     wherein said LED bulb is adapted to releasably connect with said back to form said improved motorcycle headlight;
   a motorcycle headlight housing mounting bracket including:
     mounting clips;
       wherein said mounting clips are adapted to be releasably connected to said first and second connectors of said back;
   wherein said motorcycle headlight housing mounting bracket is adapted to releasably connect said back of said improved motorcycle headlight to a headlight housing of a motorcycle headlight;
   wherein said first and second connectors of said back are formed having a flat and elongated shape that includes a mounting hole therethrough; and
   wherein said mounting clips of said motorcycle headlight housing mounting bracket are formed having a flat and elongated shape that includes a mounting hole therethrough adapted to align with said mounting holes of said first and second connectors of said back; and
   wherein said improved motorcycle headlight further comprises a plurality of mounting screws adapted to be screwed between respective said mounting holes of said first and second connectors and said mounting holes of said mounting clips of said motorcycle headlight housing mounting bracket.

2. The improved motorcycle headlight of claim 1, wherein said back further comprises:
   an electric cord aperture; and
   wherein said improved motorcycle headlight further comprises:
     an electrical cord;
     wherein said electrical cord is adapted to attach to and pass through said electric cord aperture and provide electrical power to said LED bulb.

3. The improved motorcycle headlight of claim 1, wherein said back further comprises:
   a plurality of spaced adjustment screw holes; and
   wherein said motorcycle headlight housing mounting bracket further comprises:
     a plurality of spaced adjustment screw holes;
   wherein said plurality of adjustment screw holes of said back are adapted to align with said plurality of spaced adjustment screw holes of said motorcycle headlight housing mounting bracket; and
   wherein said improved motorcycle headlight further comprises:
     a plurality of adjustment screws adapted to be screwed into respective said plurality of adjustment screw holes of said back and said motorcycle headlight housing mounting bracket in order to allow the adjustment of the angle of said back with respect to said motorcycle headlight housing mounting bracket, and thereby the angle of said improved motorcycle headlight with respect to a headlight housing of an existing motorcycle headlight.

4. The improved motorcycle headlight of claim 1, wherein said back is formed having a circular cross-section and a circumferential edge, and wherein said first and second connectors are located on opposite locations upon said circumferential edge.

5. The improved motorcycle headlight of claim 1, further comprising:
   a headlight housing;
      wherein said headlight housing is adapted to releasably retain said motorcycle headlight housing mounting bracket and said back and said LED bulb thereto; and
      wherein said headlight housing is adapted to be releasably connected to the front end of a motorcycle.

6. The improved motorcycle headlight of claim 1, wherein said LED lights of said LED bulb comprises a center light surrounded in a circular-type formation by a plurality of outer lights.

\* \* \* \* \*